W. N. C. Willson,
Tobacco Cutter.
No. 109,959. Patented Mar. 15, 1870.
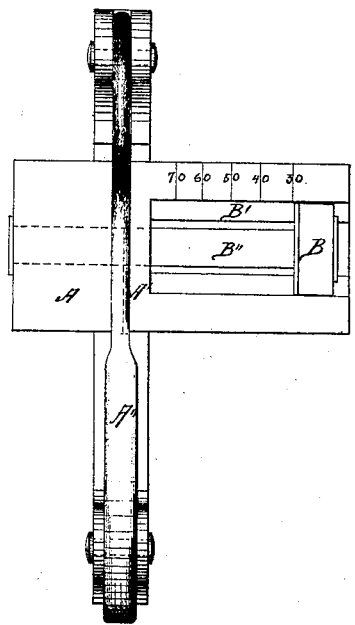
Witnesses:
Victor Hagmann
C. A. Pettit
Inventor:
W. N. C. Willson
per Munn & Co
Attorneys.

United States Patent Office.

W. N. C. WILLSON, OF SUMMIT POINT, WEST VIRGINIA.

Letters Patent No. 100,959, dated March 15, 1870.

GAUGE FOR TOBACCO-CUTTERS.

The Schedule referred to in these Letters Patent and making part of the same.

*To all whom it may concern:*

Be it known that I, W. N. C. WILLSON, of Summit Point, in the county of Jefferson, and State of West Virginia, have invented a new and improved Gauge for Tobacco-Cutter; and I do hereby declare that the following is a full, clear, and exact description of the same, reference being had to the accompanying drawings making a part of this specification, in which—

The figure is a plan view.

This invention has for its object to gauge with accuracy the quantity of tobacco of different qualities which the same amount of money will buy, and to secure uniformity in quantity at different times when the quality is the same.

In the drawings—

A is the bed-plate; A′, the blade, and A″, the lever of a tobacco-cutter, all of ordinary construction.

At one side of the blade is a sliding block, B, placed across a suitable guide-way, B′, in the bed-plate, and provided with a spring, B″, whose tendency is to draw the block toward the blade.

On the surface of the bed-plate, at one side of the guide-way, is inscribed a graduated scale, marked, in this instance, 70, 60, 50, 40, 30. These figures indicate the prices per plug of different qualities of tobacco, and the dimensions of the scale are adapted to pieces of the value, say, of ten cents each.

The revenue laws of the United States require that the tobacco held by retailers shall be kept in the original plugs, from which the dealer is obliged to cut off pieces from time to time as they are wanted.

If a buyer asks for a piece of the value of ten cents, (which is the quantity usually sold,) of that quality rated at seventy cents per plug, the plug is run under the knife from the opposite side to the gauge, pushing before it the latter until the index points to the figure 70.

The part between the index and the blade is the required quantity, which will always be exactly the same, no matter how many pieces are cut off, thus enabling the dealer to secure uniformity among those of his customers who buy off the same brand.

If the applicant desires ten cents worth of either of the lower grades, the operator has only to shift the gauge to the appropriate number and move the plug along, the quantity, of course, being greater as the quality deteriorates.

The ends of the block B fit closely the sides of the guide-way, and the block being placed straight across the guide-way, it keeps the plug always at right angles to the blade, thus insuring uniformity of size in the pieces, and, consequently, uniformity of value.

The spring B″ draws the block to the inner end of the guide-way as soon as the plug is removed, and thus the block is always ready to be moved outward by the plug for the purpose of measuring the piece to be cut off.

Having thus described my invention,

What I claim as new, and desire to secure by Letters Patent, is—

The combination, with a tobacco-cutter, of the block B, spring B″, guide-way B′, and a scale indicating prices, substantially in the manner described.

W. N. C. WILLSON.

Witnesses:
    GEO. E. BROWN,
    CHAS. A. PETTIT.